United States Patent
Jayabalan et al.

(10) Patent No.: US 10,922,706 B2
(45) Date of Patent: Feb. 16, 2021

(54) PURCHASE REFERRAL INCENTIVIZER

(71) Applicant: TARGET BRANDS, INC., Minneapolis, MN (US)

(72) Inventors: Jeyaraj Jayabalan, Bangalore (IN); Aneesh Kumar, Bangalore (IN); Sabariraj Kamaraj, Bangalore (IN); Sudalai Muthu Avudaiappan, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 108 days.

(21) Appl. No.: 15/953,915

(22) Filed: Apr. 16, 2018

(65) Prior Publication Data

US 2018/0308115 A1    Oct. 25, 2018

Related U.S. Application Data

(60) Provisional application No. 62/489,119, filed on Apr. 24, 2017.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0214* (2013.01); *G06Q 30/0239* (2013.01); *G06Q 50/01* (2013.01)

(58) Field of Classification Search
CPC . G06Q 30/0214; G06Q 30/0269; G06Q 50/01
USPC ...................................................... 705/14.39
See application file for complete search history.

(56) References Cited

U.S. PATENT DOCUMENTS

| | | | |
|---|---|---|---|
| 8,423,610 B2* | 4/2013 | Cierniak | G06F 16/958 709/203 |
| 9,466,077 B2* | 10/2016 | Goel | G06Q 30/02 |
| 9,953,378 B2* | 4/2018 | Purves | G06Q 30/0613 |
| 10,546,326 B2* | 1/2020 | Publicover | H04N 21/25883 |
| 2002/0138588 A1* | 9/2002 | Leeds | H04L 12/1831 709/217 |
| 2012/0150598 A1* | 6/2012 | Griggs | G06Q 30/0214 705/14.16 |
| 2012/0215640 A1* | 8/2012 | Ramer | G06Q 30/0269 705/14.55 |
| 2013/0013383 A1 | 1/2013 | Vitti et al. | |
| 2013/0346172 A1 | 12/2013 | Wu | |

(Continued)

*Primary Examiner* — David J Stoltenberg
*Assistant Examiner* — Michael I Ezewoko
(74) *Attorney, Agent, or Firm* — Hamre, Schumann, Mueller & Larson, P.C.

(57) ABSTRACT

A computer-implemented method for incentivizing referral of one or more products for purchase is disclosed. The computer-implemented method includes, in response to receiving an indication at a server of a purchase having been completed by a user, providing an option to share the purchase via one or more social networks. In response to receiving an indication that the user has selected to share the purchase via a social network post, a hyperlink is appended to the social network post and is posted on one or more social networks. In response to one or more social network connections of the user selecting the hyperlink in the social network post and making a purchase of a product, a notification is transmitted from the server to the user, the notification including one or more incentives.

20 Claims, 5 Drawing Sheets

(56) References Cited

U.S. PATENT DOCUMENTS

2014/0229231 A1     8/2014   Lynn
2014/0344067 A1   11/2014   Connor, IV
2015/0088630 A1     3/2015   Taylor et al.
2015/0262245 A1     9/2015   Arvanitis
2015/0339695 A1   11/2015   Fomine
2016/0350780 A1*   12/2016   G ................ G06Q 30/0214

* cited by examiner

```
┌─────────────────────────────────────┐
│ RECEIVE AN INDICATION THAT A SOCIAL │
│  MEDIA CONNECTION HAS SELECTED A    │
│  HYPERLINK IN A SOCIAL MEDIA POST   │
│                 155                 │
└─────────────────────────────────────┘
                   │
                   ▼
┌─────────────────────────────────────┐
│ RECEIVE AN INDICATION OF ONE OR MORE│
│   PRODUCTS FOR PURCHASE FROM THE    │
│      SOCIAL MEDIA CONNECTION        │
│                 160                 │
└─────────────────────────────────────┘
```

PURCHASE REFERRAL INCENTIVIZER

FIELD

This disclosure relates generally to systems and methods for sharing information via a social network. More specifically, this disclosure relates to systems and methods for sharing information about purchases made from a retailer via a social network and rewarding a user for subsequent purchases made resulting from the sharing.

BACKGROUND

Online shopping is a continuously growing industry. A user engaging in online shopping can locate potential products of interest in a number of ways, including by conducting Internet searching, via a social network, going directly to a website known by the user, or the like. Improved ways to present products to a user for possible purchase are desirable.

SUMMARY

This disclosure relates generally to systems and methods for sharing information via a social network. More specifically, this disclosure relates to systems and methods for sharing information about purchases made from a retailer via a social network and rewarding a user for subsequent purchases made resulting from the sharing.

In an embodiment, a user who has selected one or more items for purchase may share information about that purchase by making a social network post via one or more social networks. In an embodiment, the user may select to share information about the purchase by selecting a hyperlink in one or more confirmation messages generated as a result of the purchase. In an embodiment, the user may select to share information about the purchase by selecting a hyperlink in an order history included in the user's account with a company (e.g., a retailer) that owns and/or operates a website through which the user made the purchase.

In an embodiment, the information shared in the social network post can include a hyperlink for purchasing the product(s) included in the social network post.

In an embodiment, the hyperlink can be encoded with information based on the user who made the purchase and the corresponding social network post. In an embodiment, the hyperlink can be a shortened hyperlink.

In an embodiment, a social network connection of the user can select the hyperlink to shop the product(s) included in the social network post. In an embodiment, the social network connection may be presented with the product purchased by the user when the social network connection is forwarded to the website at which the user made the purchase.

In an embodiment, if the social network connection makes a purchase, the user may receive a notification that one of her social network connections made a purchase based on the social network post. In an embodiment, the notification may include one or more incentives for the user. The one or more incentives can include, but are not limited to, a gift card, a coupon or discount code, a credit, or the like.

In an embodiment, the purchase by the social network connection does not include a same product as the product which was purchased by the user and included in the social network post.

A computer-implemented method for incentivizing referral of one or more products for purchase is disclosed. The computer-implemented method includes, in response to receiving an indication at a server of a purchase having been completed by a user, providing an option to share the purchase via one or more social networks. In response to receiving an indication that the user has selected to share the purchase via a social network post, a hyperlink is appended to the social network post and is posted on one or more social networks. In response to one or more social network connections of the user selecting the hyperlink in the social network post and making a purchase of a product, a notification is transmitted from the server to the user, the notification including one or more incentives.

A computer-implemented method is disclosed. The computer-implemented method includes receiving, by a server from a user device including a display and an input, a request to electronically share a purchase made by a user via a website on a social network. The method includes instructing, by the server to the user device, the user device to display a user interface for entering a social network post; and receiving, by the server from the user device, the social network post. The method includes appending automatically, by the server, a hyperlink into the social network post and sending the social network post to one or more social networks via a network. The method further includes receiving, by the server, a selection of the hyperlink in the social network post from a second user device. The method includes causing the website to be displayed on the second user device; and receiving, from the second user device, a completed purchase request. In response to receiving the indication of the completed purchase request from the second user device, the method includes sending a notification including an incentive to the user.

A system is disclosed. The system includes a server and a database. The server includes a processor and a memory. The server receives, from a user device including a display and an input, a request to electronically share a purchase made by a user via a website on a social network. The server instructs the user device to display a user interface for entering a social network post. The server receives the social network post and automatically appends a hyperlink into the social network post and sending the social network post to one or more social networks via a network. The server receives a selection of the hyperlink in the social network post from a second user device and causes the website to be displayed on the second user device. The server receives, from the second user device, a completed purchase request. In response to receiving the indication of the completed purchase request from the second user device, the server sends a notification including an incentive to the user.

A purchase sharing incentivizer is disclosed. The purchase sharing incentivizer includes a computer device including one or more processors and one or more non-transitory computer-readable media programmed with program instructions which, when the program instructions are executed, causes the computer device to receive a request to electronically share a purchase made by a user via a website on a social network. The computer device instructs the user device to display a user interface for entering a social network post; and to receive the social network post. The computer device automatically appends a hyperlink into the social network post and sends the social network post to one or more social networks via a network. The computer device receives a selection of the hyperlink in the social network post from a second user device; and causes the website to be displayed on the second user device. The computer device receives, from the second user device, a completed purchase request; and in response to receiving the indication of the completed purchase request from the second user device, sends a notification including an incentive to the user, wherein the incentive includes one or more of a gift card, a coupon or discount code, and a credit.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to systems and methods for sharing information via a social network. More specifically, this disclosure relates to systems and methods for sharing information about purchases made from a retailer via a social network and rewarding a user for subsequent purchases made because of the sharing.

A website, as used in this specification, includes a website system including at least one server that is connectable to the Internet and that is configured to provide a website that is viewable on the Internet. The website can display a plurality of product images or products for purchase from a retailer.

A social network, as used in this specification, includes a virtual community or network in which people can create, share, and/or exchange information and ideas, for example, online via the Internet. Examples of social networks include, but are not limited to, Pinterest, Facebook, Instagram, Twitter, Google+, and the like.

In an embodiment, a website is described that presents a user interface that displays images of a product to a user for purchase. The website can be, for example, a website that is owned, operated, and/or controlled by a retail company, with the products that are displayed being for sale by the retail company either in a retail store or online on the same website or on a separate website.

Figure 1:
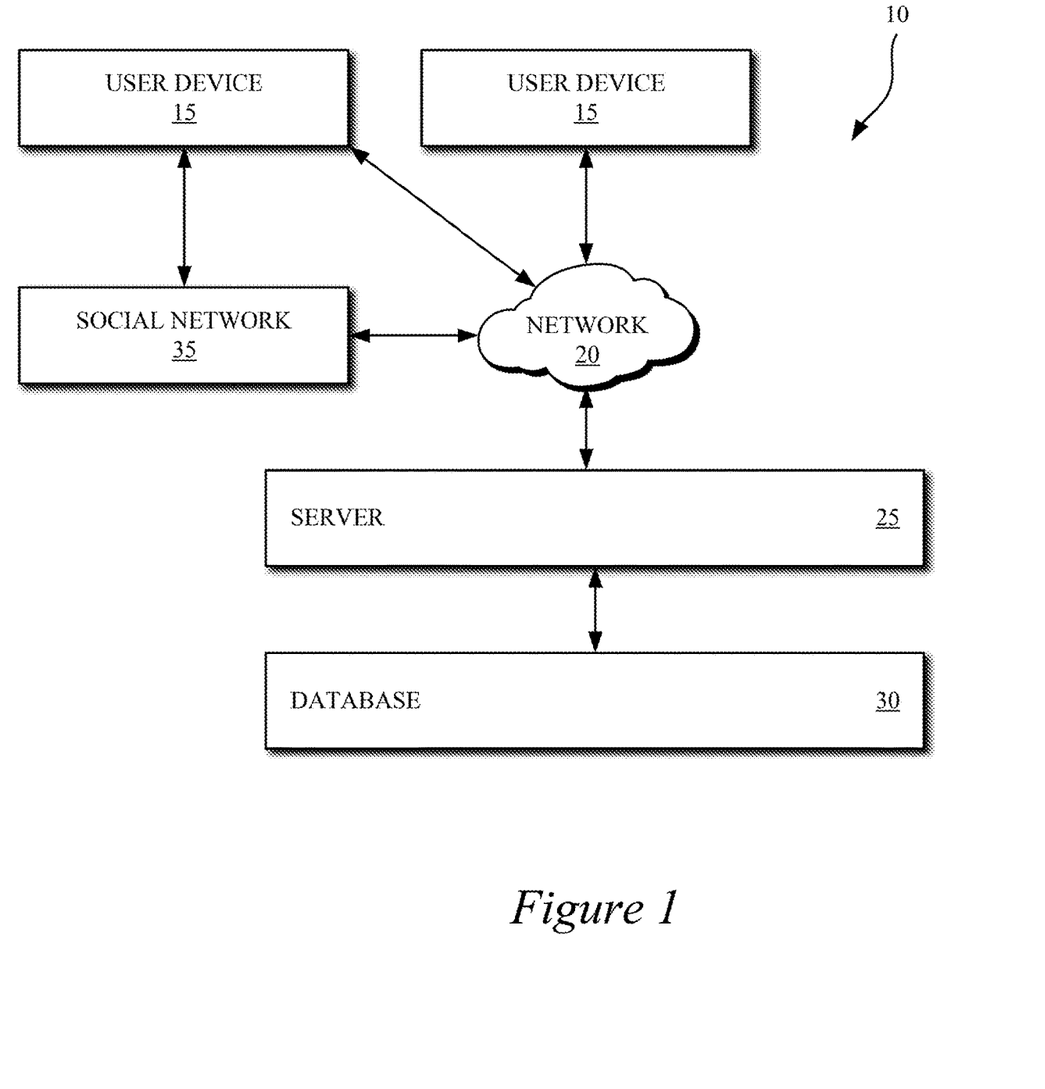
FIG. 1 is a schematic diagram of a system for implementing the referral system and methods described in this specification, according to an embodiment.

FIG. 1 is a schematic diagram of a system 10 for implementing the systems, methods, and GUIs described in the specification, according to an embodiment. The system 10 includes a server 25 in communication with a user device 15 via a network 20. It will be appreciated that a number of user devices 15 can vary.

The server 25 can make a referral system available to the user device 15 via the network 20. In an embodiment, aspects of the server 25 can be the same as or similar to aspects of the server device 535 as shown and described in accordance with FIG. 5 below.

In an embodiment, the network 20 is representative of the Internet. In an embodiment, the network 20 can include, for example, a local area network (LAN), a wide area network (WAN), a wireless network, a cellular data network, combinations thereof, or the like. In an embodiment, aspects of the network 20 can be the same as or similar to aspects of the network 540 as shown and described in accordance with FIG. 5 below.

Examples of the user device 15 include, but are not limited to, a personal computer (PC), a laptop computer, a mobile device (e.g., a smartphone, a personal digital assistant (PDA), a table-style device, etc.), a wearable mobile device (e.g., a smart watch, head wearable device, etc.), or the like. The user device 15 generally includes a display device and an input device. Examples of the display device for the user device 15 include, but are not limited to, a monitor connected to a PC, a laptop screen, a mobile device screen, a tablet screen, or the like. In an embodiment, aspects of the user device 15 can be the same as, or similar to, aspects of user devices 501 as shown and described in accordance with FIG. 5 below.

The server 25 is in communication with a database 30. The database 30 can include a variety of information. For example, the database 30 can include information about one or more products sold by a retailer, one or more users having an account with the retailer, or the like. The database 30 and the corresponding components are not intended to reflect a specific structure. In an embodiment, one or more additional databases can be included in the system 10.

The server 25 is in communication with a social network 35 via the network 20. In an embodiment, the social network 35 can be used to share information about a completed purchase made by a user. The social network 35 can also be used as an entry point to a retailer's website. For example, a user may be able to select a hyperlink available via the social network 35 that directs the user to the retailer's website as made available by the server 25. Information from the social network 35 can be provided to the server 25 (e.g., as a result of a hyperlink selected) to cause a particular GUI to be displayed on the user device 15, initiate tracking (e.g., via cookies or the like), or the like. Examples of the social network 35 include, but are not limited to, Pinterest, Facebook, Instagram, Google+, Twitter, or the like. It will be appreciated that this list of social networks is an example and is not intended to be limiting. The social network 35 can include other social networks not included in the preceding list that function according to the principles described in this specification.

Figure 2:
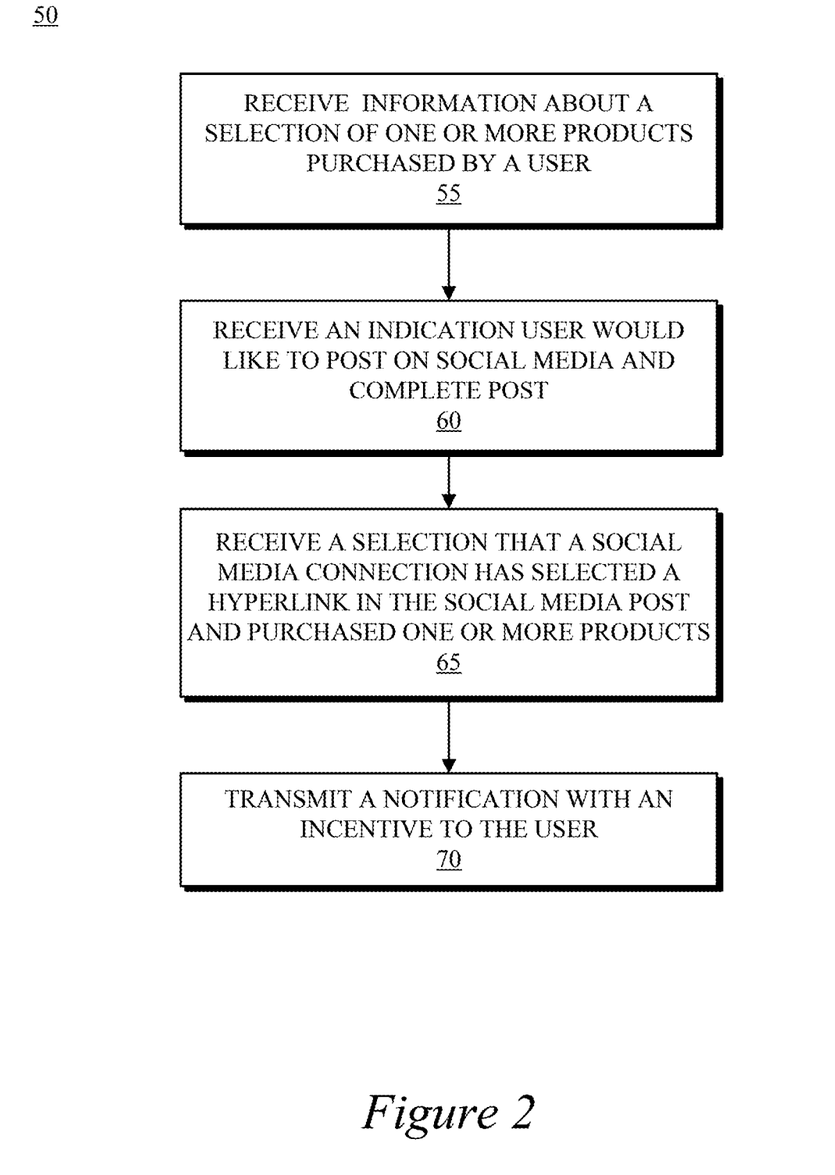
FIG. 2 is a flowchart for a method to incentivize sharing of a purchase made by a customer, according to an embodiment.

FIG. 2 is a flowchart for a method 50 to incentivize sharing of a purchase made by a customer, according to an embodiment. In an embodiment, the purchase can be made via a website of a retailer. In an embodiment, the purchase can be made in a store of the retailer. In an embodiment, an in-store purchase may be included if the purchase is identified in an order history that is electronically accessible by the user via, for example, logging into an account with the retailer via the retailer's website.

In the method 50, at 55 a server (e.g., the server 25 in FIG. 1) receives information corresponding to a selection of one or more products purchased by a user (e.g., by the user via the user device 15 in FIG. 1). In an embodiment, 55 can include one or more additional steps which are described in additional detail in accordance with FIG. 3 below.

At 60, the server 25 receives a request that the user would like to post a comment about the completed purchase on one or more social networks (e.g., the social network 35 in FIG. 1). In response to the request, the server 25 can make an interface available via the user device 15. The user can create the social network post via the interface and the user device 15. In an embodiment, the server 25 can send an instruction to the user device 15 via the network 20 that causes the user device 15 to open a website of the social network 35 via a web browser on the user device 15. In an embodiment, the server 25 can send an instruction to the user device 15 that can cause the user device 15 to open a software application installed on the user device 15, the software application being for the social network 35. The user can complete the social network post via the interface. When the social network post is complete, the user can select a hyperlink or the like to submit the social network post. In an embodiment, the social network post can thus be created directly in the social network 35. In an embodiment, the server 25 can cause an interface to be displayed via the retailer's website that enables the user to complete the social network post. In such an embodiment, the user may include login details for the social network 35 in the user's account with the retailer. In such an embodiment, the interface may include a hyperlink or the like, that when selected, causes the social network post to be transmitted to the one or more social networks 35 via the network 20. The social network post can include, for example, text, images, video, or the like. A hyperlink is appended to the social network post by the server 25. The hyperlink can be encoded so that anyone selecting the hyperlink will be identifiable by the server 25.

At 65, one or more social network connections of the user can select the hyperlink appended in the social network post at 60. The particular social network connection that selects the hyperlink is forwarded to the retailer's website by the server 25. Upon making a purchase, the user that posted on the social network 35 at 60 may receive a notification, for example, from the server 25 at 70. The notification at 70 may include one or more incentives for the user. For example, in an embodiment, the notification at 70 may include an indication that a gift card has been earned, a discount or coupon code, an account credit (e.g., based on, for example, an amount of the purchase made by the social network connection, etc.), or the like. The notification can be provided electronically via, for example, an email message, a text message, or the like. In an embodiment, the server 25 can generate an electronic notification that is displayed on the user device 15. For example, the electronic notification can be a notification from an application on the user device 15 that is displayed on the user device 15.

Figure 3:
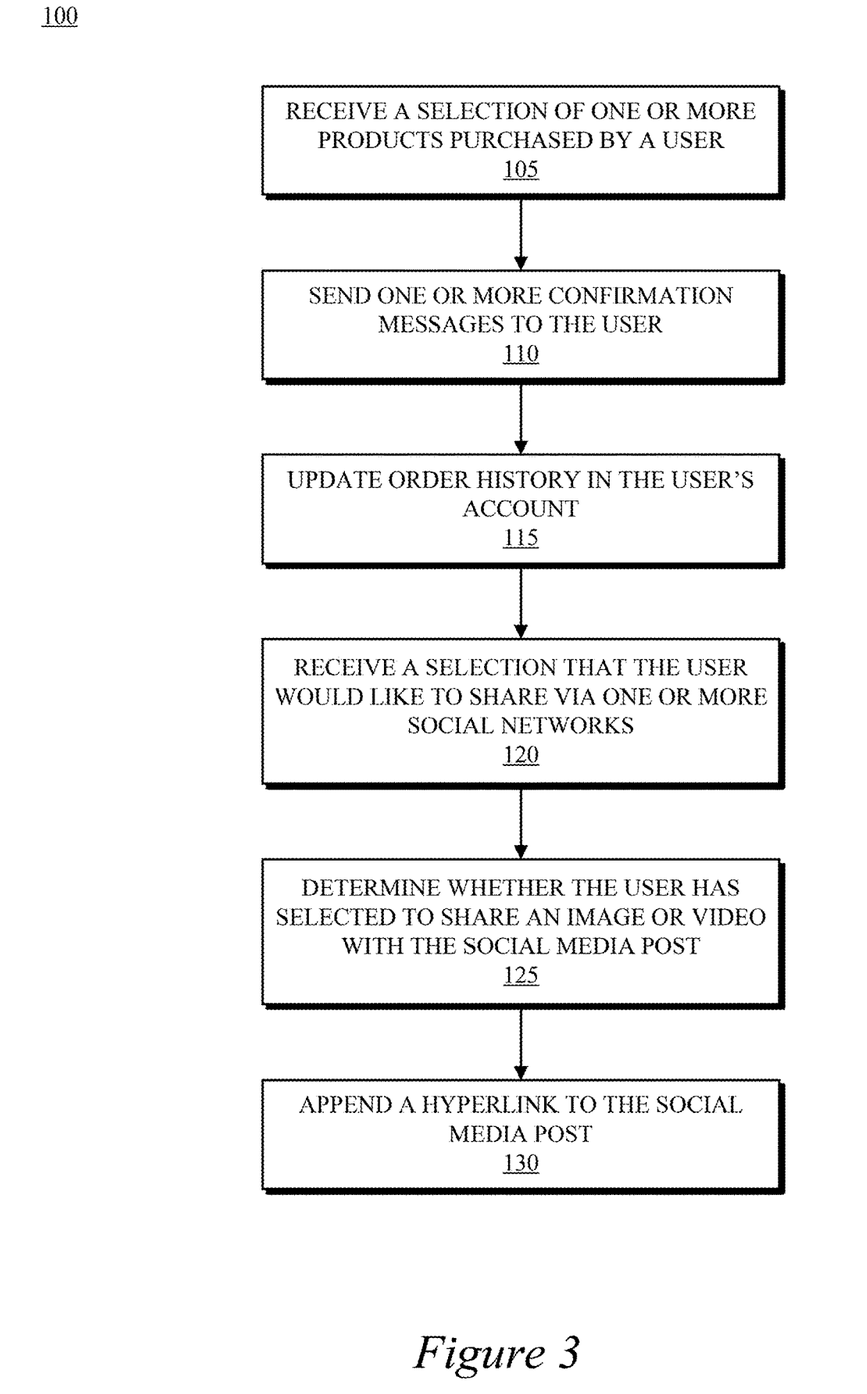
FIG. 3 is a flowchart for a method to recommend a product purchased by a user to one or more social network connections of the user via a social network, according to an embodiment.

FIG. 3 is a flowchart for a method 100 to recommend a product purchased by a user to one or more social network connections of the user via a social network (e.g., the social network 25 in FIG. 1), according to an embodiment. The method 100 is an embodiment of 55 and 60 (FIG. 2). That is, the method 100 can be inserted into the method 50 for 55 and 60, according to an embodiment.

In the method 100, at 105 a server (e.g., the server 25 in FIG. 1) receives a selection of one or more products purchased by a user (e.g., by the user via the user device 15 in FIG. 1).

At 110, the user receives a confirmation message (e.g., an electronic notification such as, but not limited to, an email message, electronic notification, text message, or the like) from the server 25. It will be appreciated that the user may receive more than one confirmation message from the server 25. For example, the user may receive a confirmation message upon completing the purchase; a confirmation message when the purchased product(s) has/have shipped; a confirmation message after the purchased product(s) has/have been delivered; combinations thereof; or the like. At least one of the confirmation messages can include one or more hyperlinks to share the purchase via one or more social networks 35. It will be appreciated that the hyperlinks can be represented as text, a selectable image, or combinations thereof. For example, the hyperlink can be an icon representative of the social network 35, according to an embodiment. In an embodiment, the confirmation message including the share option will be a message that is delivered after the user has received the purchased product. It will be appreciated that any of the messages after purchase of the product can also or alternatively include the share option.

At 115, the server 25 can update an order history in the user's account. It will be appreciated that 115 can be completed prior to the one or more confirmation messages being sent to the user at 110, according to an embodiment. In an embodiment, one or more hyperlinks can be included in the order history which may be viewable on the website.

At 120, the server 25 receives a selection that the user would like to share the purchase via one or more social networks 35 in response to the user selecting one of the hyperlinks to share the purchase via one of the social networks 35. The server 25 can receive the selection in response to the user selecting the one of the hyperlinks via the one or more confirmation messages, according to an embodiment. In an embodiment, the server 25 can receive the selection in response to the user selecting the one of the hyperlinks via the user's order history.

In response to the request, the server 25 can make an interface available via the user device 15. The user can create the social network post via the interface and the user device 15. In an embodiment, the server 25 can send an instruction to the user device 15 via the network 20 that causes the user device 15 to open a website of the social network 35 via a web browser on the user device 15. In an embodiment, the server 25 can send an instruction to the user device 15 that can cause the user device 15 to open a software application installed on the user device 15, the software application being for the social network 35. The user can complete the social network post via the interface. When the social network post is complete, the user can select a hyperlink or the like to submit the social network post. In an embodiment, the social network post can thus be created directly in the social network 35. In an embodiment, the server 25 can cause an interface to be displayed via the retailer's website that enables the user to complete the social network post. In such an embodiment, the user may include login details for the social network in the user's account with the retailer. In such an embodiment, the interface may include a hyperlink or the like, that when selected, causes the social network post to be transmitted to the one or more social networks 35 via the network 20.

At 125, the server 25 may cause a user to be provided with an option to choose whether to attach an image or video to the social network post. It will be appreciated that including an image or video is optional, and the user may choose to skip this feature and proceed by posting a text-based comment.

At 130, in response to determining whether the user has selected to attach an image or video to the post, a hyperlink is appended to the comments added by the user. If the user posts an image or video without any comment, the hyperlink can be appended as the only comment. In an embodiment, if the user posts an image or video without any comment, the hyperlink may be embedded into the image or video such that clicking on the image or video causes the hyperlinked action to occur. In an embodiment, if the user posts an image or video without any comments, a hyperlink and additional text may be appended to the post. For example, the additional text can be selected by the retailer and can include, for example, a comment to "Check out my purchase" or the like. In an embodiment, when the user completes the social network post, the user can select a hyperlink or the like that will forward the information included in the social network post to the social network 35.

Figure 4:
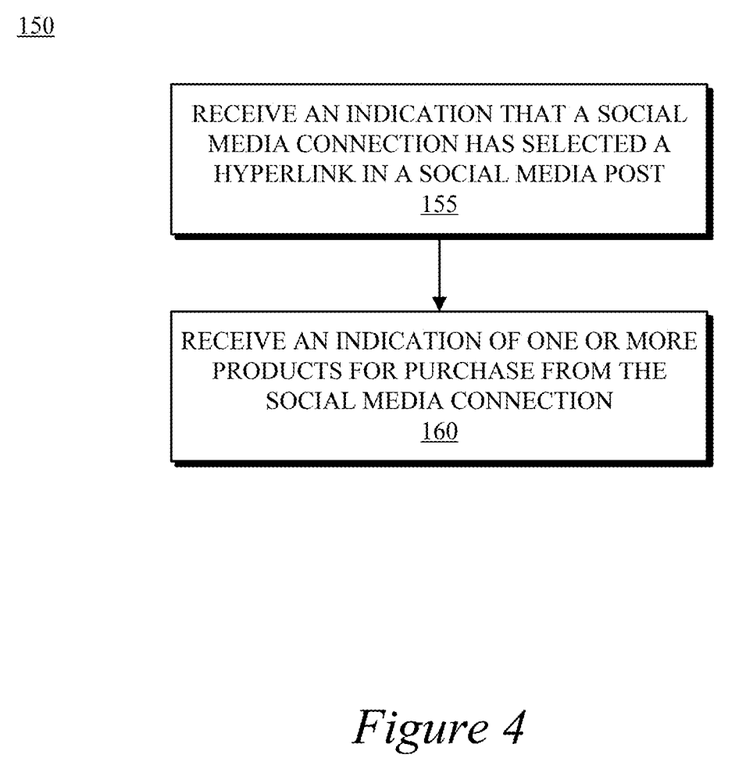
FIG. 4 is a method to purchase a recommended product by a social network connection based on a post on the social network, according to an embodiment.

FIG. 4 is a flowchart for a method 150 to purchase a recommended product by a social network connection based on a post on a social network (e.g., social network 35 in FIG. 1), according to an embodiment. The method 150 is an embodiment of 65 (FIG. 2). That is, the method 150 can be inserted into the method 50 at 65.

In the method 150, at 155 a server (e.g., the server 25) can receive an indication that a social network connection of the user in FIG. 3 has selected the hyperlink appended at 130 (FIG. 3). In response to the social network connection selecting the hyperlink, the social network connection is forwarded to the website of the retailer. The social network connection may be presented with the product that was purchased and included in the social network post. For example, if the social network post was for headphones by Brand A, then the social network connection may first be presented with the headphones by Brand A for purchase. The social network connection is then free to shop throughout the website and identify one or more products for purchase. In an embodiment, the shopping activity of the social network connection can be tracked by, for example, use of cookies or the like.

At 160, the server 25 may receive an indication that the social network connection has selected one or more products for purchase. The one or more products selected for purchase can include the product that was included in the social network post. It will be appreciated that the one or more products selected for purchase may not include the product that was included in the social network post, in an embodiment.

Figure 5:
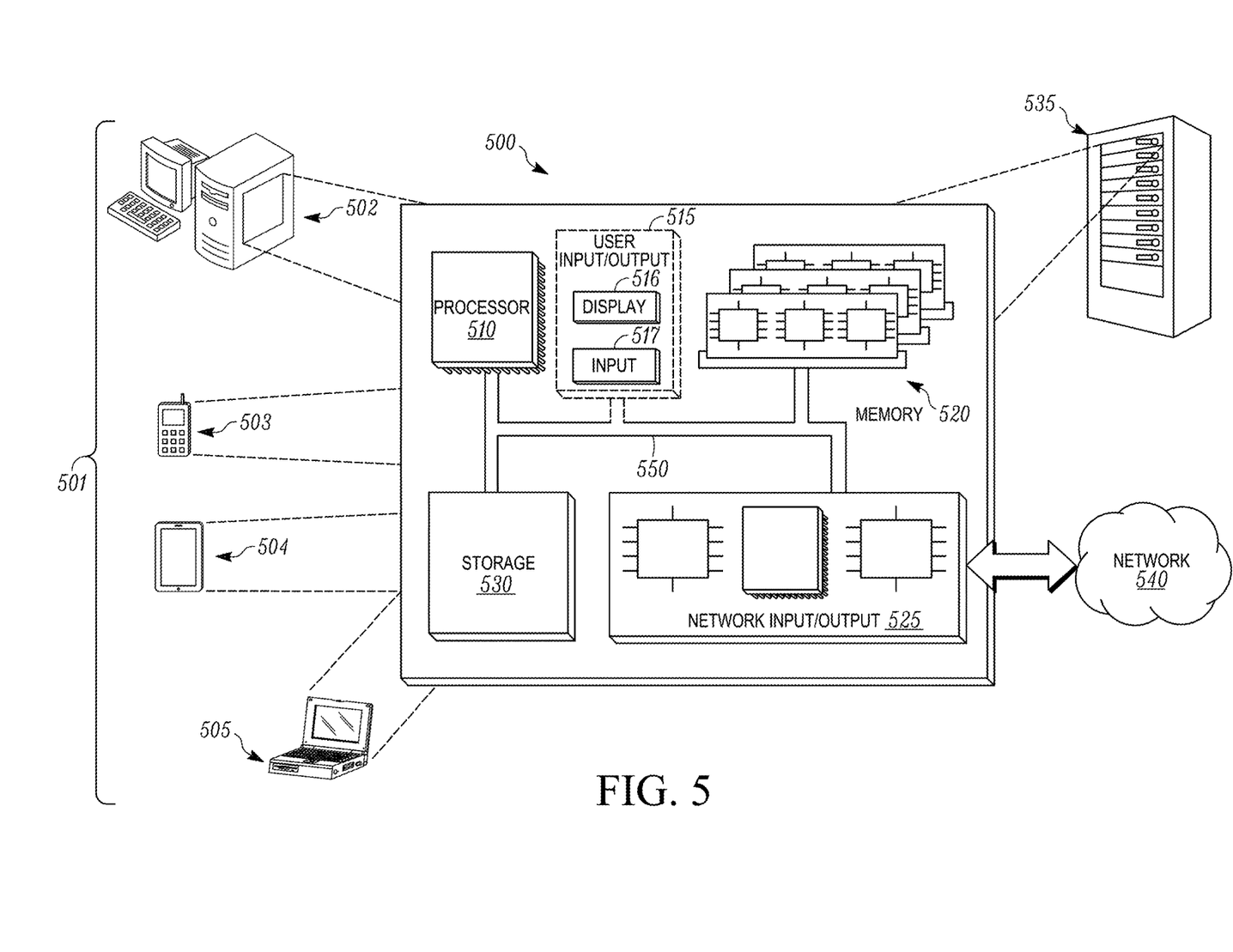
FIG. 5 is a schematic diagram of architecture for a computer device, according to an embodiment.

FIG. 5 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspect 1. A computer-implemented method, comprising: via a website that is accessible via a user device and that is made available by one or more servers: receiving a request to share a purchase made by a user via the website on a social network; receiving a social network post; appending a hyperlink into the social network post and sending the social network post to one or more social networks via a network; receiving a selection of the hyperlink in the social network post from a second user device; causing the website to be displayed on the second user device; and in response to receiving an indication of a completed purchase from the second user device, sending a notification including an incentive to the user.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary.

What is claimed is:

1. A computer-implemented method to incentivize sharing of a purchase made by a user on a retailer's website, comprising:

a server receiving a selection of one or more products purchased by the user on the retailer's website;

the server sending an electronic confirmation to the user regarding the purchase made by the user on the retailer's website, the electronic confirmation including a confirmation hyperlink to share the purchase via one or more social networks;

the server receiving, via user selection of the confirmation hyperlink, a request to electronically share the purchase made by the user via at least one of the one or more social networks;

instructing, by the server to a user device that includes a display and an input, the user device to display a user interface for allowing the user to create a social network post, the user interface including an option for the user to attach an image or video to the user created social network post;

receiving, by the server from the user device, the user created social network post including only a user attached image or video without any text provided by the user via the user device;

determining, by the server, that the user created social network post received from the user via the user device includes only the user attached image or video without any text;

appending automatically, by the server, a sharing hyperlink into the user created social network post and sending the user created social network post to the at least one of the one or more social networks via a network, the appending including embedding the sharing hyperlink into the user attached image or the user attached video of the user created social network post upon the server determining that the user created social network post includes only the user attached image or the user attached video without any text provided by the user via the user device, wherein the sharing hyperlink directs a second user to the retailer's website and is encoded such that anyone selecting the sharing hyperlink is identifiable by the server;

the server sending the user created social network post to at least one of the one or more social networks via a network;

receiving, by the server, a selection of the sharing hyperlink in the user created social network post from a second user device;

causing the retailer's website to be displayed on the second user device in response to receiving, by the server, the selection of the sharing hyperlink in the user created social network post from the second user device, wherein the server causes at least one of the one or more products purchased by the user to be displayed via the retailer's website on the second user device;

receiving, from the second user device, a completed purchase request of at least one product for purchase on the retailer's website; and in response to receiving the indication of the completed purchase request from the second user device, sending a notification including an incentive to the user, wherein the incentive includes one or more of a gift card, a coupon or discount code, and a credit.

2. The computer-implemented method according to claim 1, wherein the notification including the incentive is sent to the user via an email message or a text message.

3. The computer-implemented method according to claim 1, wherein the incentive is provided directly to an electronic account associated with the user and stored in a database accessible by the server.

4. The computer-implemented method according to claim 1, wherein the request to electronically share the purchase made by the user via the at least one of the one or more social networks is initiated in one of an email message, a text message, and an order history associated with the user.

5. The computer-implemented method according to claim 1, wherein instructing the user device to display the user interface for allowing the user to create the social network post includes the server sending an instruction to the user device via the network that causes the user device to open a website of the at least one of the one or more social networks via a web browser on the user device for allowing the user to create the user created social network post.

6. The computer-implemented method according to claim 1, wherein instructing the user device to display the user interface for allowing the user to create the social network post includes the server sending an instruction to the user device via the network that causes the user device to open a software application installed on the user device for the at least one of the one or more social networks for allowing the user to create the user created social network post.

7. The computer-implemented method according to claim 1, wherein instructing the user device to display the user interface for allowing the user to create the social network post includes the server sending an instruction to the user device via the network that causes the user device to open the retailer's website for allowing the user to create the user created social network post.

8. The computer-implemented method according to claim 1, further comprising the server appending a text comment to the user created social network post provided by the user via the user device that includes only the user attached image or the user attached video without any text.

9. A system that incentivizes sharing of a purchase made by a user on a retailer's website, the system comprising:

a server and a database, the server including a processor and a memory, wherein the server receives a selection of one or more products purchased by the user on the retailer's website; sends an electronic confirmation to the user regarding the purchase made by the user on the retailer's website, the electronic confirmation including a confirmation hyperlink to share the purchase via one or more social networks; receives, via user selection of the confirmation hyperlink from a user device including a display and an input, a request to electronically share the purchase made by the user via at least one of the one or more social networks; instructs the user device to display a user interface for allowing the user to create a social network post, the user interface including an option for the user to attach an image or video to the user created social network post; receives the user created social network post from the user via the user device; determines whether the user created social network post received from the user via the user device includes only a user attached image or video without any text; automatically appends a sharing hyperlink into the user created social network post provided by the user via the user device, which includes: embedding the sharing hyperlink into the user attached image or the user attached video of the user created social network post provided by the user via the user device when the server determines that the user created social network post provided by the user via the user device includes only the user attached image or the user attached video without any text, and when the server determines that the user created social network post provided by the user via the user device includes text, appending the sharing hyperlink to the text wherein the sharing hyperlink directs a second user to the retailer's website and is encoded such that anyone selecting the sharing hyperlink is identifiable by the server; sends the user created social network post to the at least one of the one or more social networks via a network; receives a selection of the sharing hyperlink in the user created social network post from a second user device; causes the retailer's website to be displayed on the second user device in response to receiving the selection of the sharing hyperlink in the user created social network post from the second user device, wherein the server causes at least one of the one or more products purchased by the user to be displayed via the retailer's website on the second user device; receives, from the second user device, a completed purchase request of at least one product for purchase on the retailer's website; and in response to receiving the indication of the completed purchase request from the second user device, sends a notification including an incentive to the user, wherein the incentive includes one or more of a gift card, a coupon or discount code, and a credit.

10. The system according to claim 9, wherein the notification including the incentive is sent to the user via an email message or a text message.

11. The system according to claim 9, wherein the incentive is provided directly to an electronic account associated with the user and stored in the database accessible by the server.

12. The system according to claim 9, wherein the request to electronically share the purchase made by the user via the at least one of the one or more social networks is initiated in one of an email message, a text message, and an order history associated with the user.

13. The system according to claim 9, wherein the server instructs the user device to display the user interface for allowing the user to create the social network post includes the server sending an instruction to the user device via the network that causes the user device to open a website of the at least one of the one or more social networks via a web browser on the user device for allowing the user to create the user created social network post.

14. The system according to claim 9, wherein the server instructs the user device to display the user interface for allowing the user to create the social network post includes the server sending an instruction to the user device via the network that causes the user device to open a software application installed on the user device for the at least one of the one or more social networks for allowing the user to create the user created social network post.

15. The system according to claim 9, wherein the server instructs the user device to display the user interface for allowing the user to create the social network post includes the server sending an instruction to the user device via the network that causes the user device to open the retailer's website for allowing the user to create the user created social network post.

16. The system according to claim 9, wherein when the server determines that the user created social network post provided by the user via the user device includes only the user attached image or the user attached video without any text, the server appends a text comment to the user created social network post.

17. A purchase sharing incentivizer that incentivizes sharing of a purchase made by a user on a retailer's website, the purchase sharing incentivizer comprising:
a computer device including one or more processors and one or more non-transitory computer-readable media programmed with program instructions which, when the program instructions are executed, causes the computer device to receive a selection of one or more products purchased by the user on the retailer's website; sends an electronic confirmation to the user regarding the purchase made by the user on the retailer's website, the electronic confirmation including a confirmation hyperlink to share the purchase via one or more social networks; to receive a request to electronically share the purchase made by the user via at least one of the one or more social networks; to instruct a user device, that includes a display and an input, to display a user interface for allowing the user to create a social network post, the user interface including an option for the user to attach an image or video to the user created social network post; to receive the user created social network post provided by the user via the user device; to determine whether the user created social network post received from the user via the user device includes only a user attached image or video without any text; to automatically append a sharing hyperlink into the user created social network post provided by the user via the user device, which includes: embedding the sharing hyperlink into the user attached image or the user attached video of the user created social network post provided by the user via the user device when the computer device determines that the user created social network post provided by the user via the user device includes only the user attached image or the user attached video without any text, and when the server determines that the user created social network post provided by the user via the user device includes text, appending the sharing hyperlink to the text; wherein the sharing hyperlink directs a second user to the retailer's website and is encoded such that anyone selecting the sharing hyperlink is identifiable by the computer device; to send the user created social network post to the at least one of the one or more social networks via a network; to receive a selection of the sharing hyperlink in the user created social network post from a second user device; to cause the retailer's website to be displayed on the second user device in response to receiving the selection of the sharing hyperlink in the user created social network post from the second user device, wherein the computer device causes at least one of the one or more products purchased by the user to be displayed via the retailer's website on the second user device; to receive, from the second user device, a completed purchase request of at least one product for purchase on the retailer's website; and in response to receiving the indication of the completed purchase request from the second user device, to send a notification including an incentive to the user, wherein the incentive includes one or more of a gift card, a coupon or discount code, and a credit, wherein the incentive includes one or more of a gift card, a coupon or discount code, and a credit.

18. The purchase sharing incentivizer of claim 17, wherein causing the computer device to instruct the user device to display the user interface for allowing the user to create the social network post includes the computer device sending an instruction to the user device via the network that causes the user device to open a website of the at least one of the one or more social networks via a web browser on the user device for allowing the user to create the user created social network post.

19. The purchase sharing incentivizer of claim 17, wherein causing the computer device to instruct the user device to display the user interface for allowing the user to create the social network post includes the computer device sending an instruction to the user device via the network that causes the user device to open a software application installed on the user device for the at least one of the one or more social networks for allowing the user to create the user created social network post.

20. The purchase sharing incentivizer of claim 17, wherein causing the computer device to instruct the user device to display the user interface for allowing the user to create the social network post includes the computer device sending an instruction to the user device via the network that causes the user device to open the retailer's website for allowing the user to create the user created social network post.

* * * * *